April 21, 1959  L. E. HOWARD  2,882,622
ROOT CUTTERS
Filed March 1, 1954  2 Sheets-Sheet 1

INVENTOR.
LAWRENCE E. HOWARD
BY
*Ogle R. Singleton*
ATTORNEY

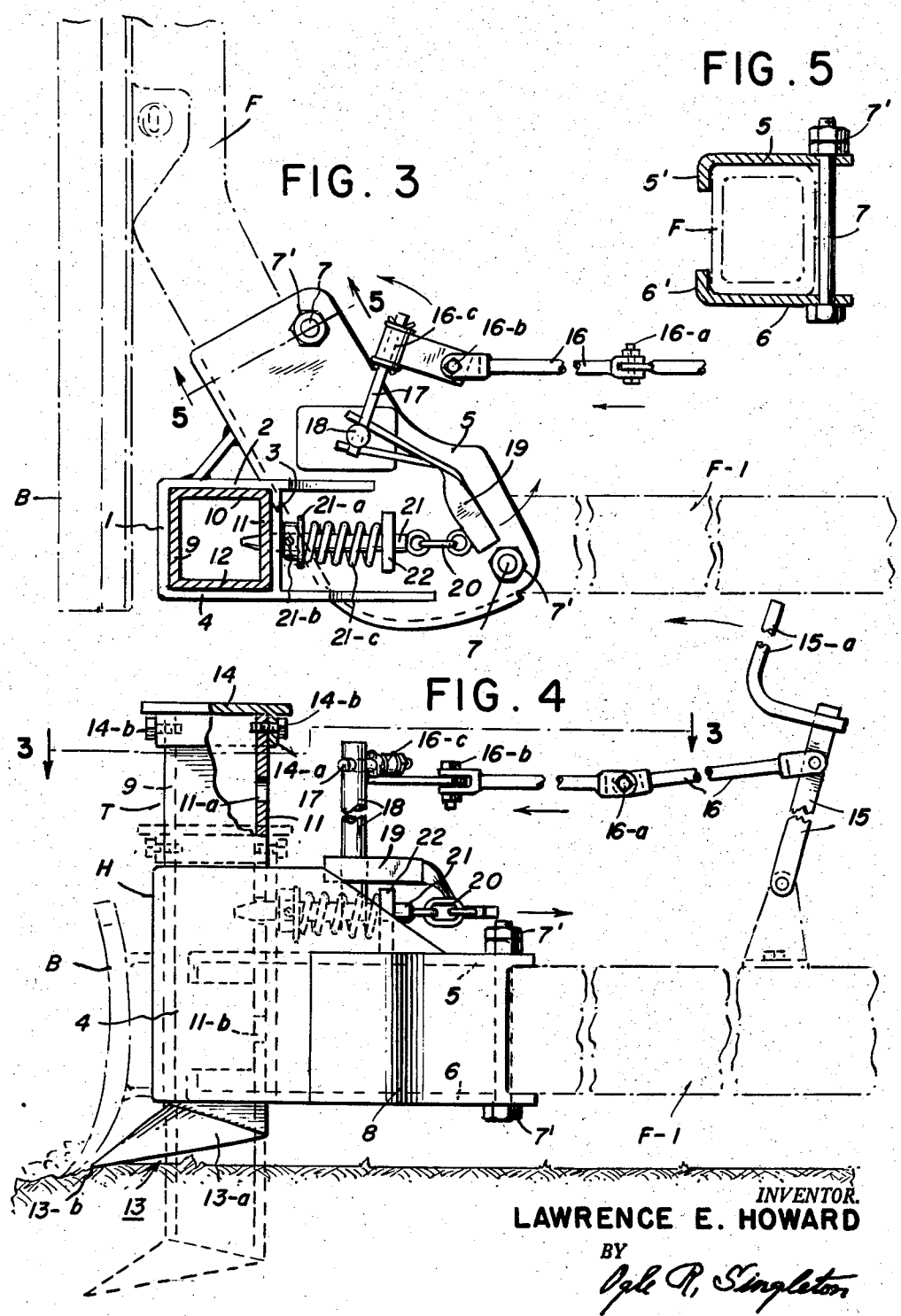

2,882,622
ROOT CUTTERS

Lawrence E. Howard, Georgetown County, S.C.

Application March 1, 1954, Serial No. 413,248

3 Claims. (Cl. 37—145)

My invention consists of a new and useful improvement in root cutters and is designed to provide a device for cutting tree roots which can be removably mounted on a conventional bulldozer. The essentially novel feature of my improved device is the combination of a housing which can be mounted on the frame carrying the blade of the bulldozer and a tool, vertically movable in the housing, which is adapted to be retracted into the housing in inoperative position and projected downwardly from the housing into operative position. The movement of the tool is effected by lowering the blade, the lower end of the tool resting on the ground, so that the housing carried by the blade moves downwardly over the tool so that it is disposed in its inoperative position, and when the blade is raised the housing moves upwardly over the tool so that it is disposed in its operative position. The device is provided with means, readily accessible to the operator of the bulldozer, for locking the tool in its adjusted positions. The peculiar advantage of the tool is the fact that it can be mounted near the outer end of the blade and in its operative position projects downwardly sufficiently below the bottom edge of the blade to trench about a tree stump and cut the roots thereof. The use of my tool makes it possible to make a narrow cut in the earth about the stump sufficient to allow the tool to cut the root, instead of using the blade of the bulldozer. Since the cutting width of the tool is quite insignificant compared to the width of the blade the advantage of my method is obvious.

If desired, the bulldozer can be provided with two tools on opposite ends of the blade.

While I have illustrated in the drawings and hereinafter fully describe certain specific embodiments of this my invention, it is to be distinctly understood that I do not consider by invention to be limited to said embodiments but refer for its scope to the claims appended thereto.

In the drawings:

Fig. 3 is a plan view partly in section on the line 3—3 of Fig. 4.

Fig. 4 is an enlarged side elevation of the device.

Fig. 5 is a vertical section on the line 5—5 of Fig. 3, in the direction of the arrows.

Figure 1:
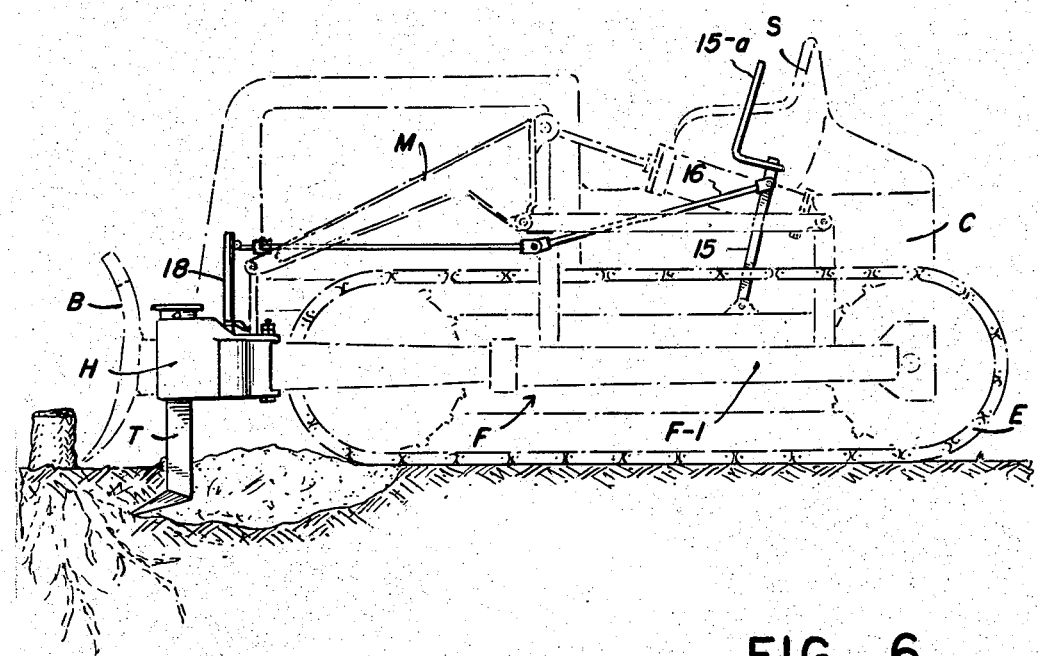
Fig. 1 is a side elevation of my improved device mounted on a conventional bulldozer shown in broken lines, in operative position to cut the roots of a stump shown in broken lines.

As illustrated in the drawings, my improved device is adapted to be mounted on a conventional bulldozer, shown in Fig. 1 in broken lines, having the chassis C, endless belt treads E, A-frame F which is pivoted at the rear of the chassis C, blade B removably mounted on the frame F, adjusting mechanism M for raising and lowering the frame F and the blade B, and the operator's seat S.

The device comprises a housing H and a tool T vertically slidable in the housing H. The housing H is in the form of a rectangular open-ended well formed by walls 1, 2, 3 and 4 (Fig. 3). The housing H has a pair of plates 5 and 6 with flanges 5' and 6' (Fig. 5) whereby the housing H is removably mounted on the A-frame F by bolts 7 and nuts 7'. It will be noted (Fig. 3) that the plates 5 and 6 are so configured and related to the well that the well is disposed co-axially with one of the legs F-1 of the frame F, forwardly of the frame F and rearwardly of the blade B. A wall 8 extends rearwardly from the wall 4 between plates 5 and 6 and about the curved forward end of the leg F-1 to afford stability to the mounting.

The tool T has a hollow rectangular stem formed by the walls 9, 10, 11 and 12 (Fig. 3) slidable on walls 1, 2, 3 and 4, respectively, a foot 13 (Fig. 4) welded on the lower end of the stem and forming a cutting member having tapered sides 13-a to form a point 13-b, and a cap 14 with depending flanges 14-a attached to the stem by bolts 14-b. It will be noted (Fig. 4) that the cap 14 is dimensioned to overlie the upper ends of the walls 1, 2, 3 and 4 of the housing H.

I will now describe the means which I provide for locking the tool T in adjusted positions relative to the housing H. An operating lever 15 (Figs. 1 and 4) is suitably pivoted on the chassis C so that its operating handle 15-a is readily accessible to the operator on the seat S. A pitman 16 is pivoted on the lever 15 and has a pair of pivots 16-a and 16-b in horizontal and vertical planes, respectively, to effect a universal joint. The pitman 16 has, on its forward end a journal 16-c in which is carried a crank 17 mounted on a rock shaft 18 suitably journaled on the plate 5 of the housing H. The shaft 18 is provided with a crank 19 attached by links 20 to a locking pin 21 which is slidably mounted in an ear 22 on plate 5, and the wall 3 of the housing H. The pin 21 has mounted thereon a washer 21-a by means of a cotter-pin 21-b. A spring 21-c coiled about pin 21 is confined between the ear 22 and the washer 21-a to bias the pin 21 toward the housing H. The tool T is provided with two holes 11-a and 11-b in its wall 11 adjacent the wall 3 of the housing H, through which the pin 21 is inserted by the spring 21-c when the tool T is in its two adjusted positions, respectively.

Figure 6:
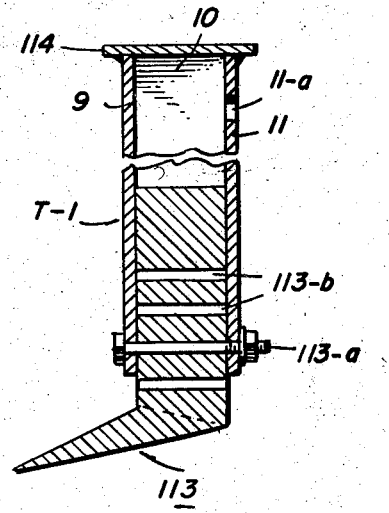
Fig. 6 is a vertical section of a modified form of cutting tool.

A modified form of tool T-1 is shown in Fig. 6 in which the head 113 is mounted on the stem by bolts 113-a. In this form, the cap 114 is welded to the stem.

Having described the details of construction of my device, I will now describe its use and operation.

The housing H is mounted on the frame F and fastened thereon by the bolts 7 and nuts 7'. The lever 15 is mounted on the chassis C and the pitman 16 connected to crank 17. The frame F is raised to lift the housing sufficiently to allow insertion of the tool T into the lower open end of the housing H. The cap 14 is then attached to the tool T by bolts 14-b. The pin 21 is passed through the ear 22. The spring 21-c is placed about the pin 21 and the washer 21-a is fastened on the pin 21 by the cotter pin 21-b. The pin 21 is fastened to the crank 19 by the links 20. The device is thus conditioned for use.

Figure 2:
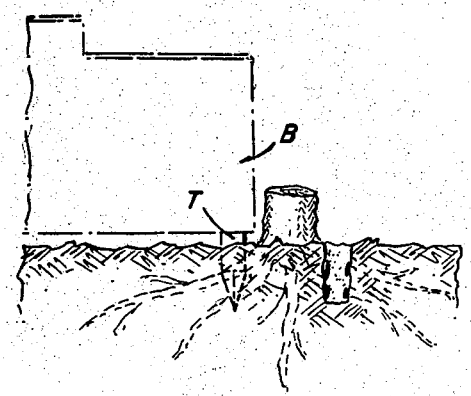
Fig. 2 is a fragmentary front elevation of the bulldozer blade, showing the device cutting the roots.

It is obvious from Figs. 1 and 2 that when the frame F raises the blade B to clear the ground and pin 21 is withdrawn by manipulation of the lever 15, to release the tool T, the tool T moves by gravity into its lower, operative position as shown in Figs. 1 and 2 and in broken lines in Fig. 4. It is then locked in this position by the pin 21 which is inserted into hole 11-a of the wall 11 of the tool T by action of the spring 21 when the lever 15 is properly manipulated.

When the bulldozer is moved to dispose the tool T in desired position relative to the stump, the foot 13 of the tool T can be driven downwardly and forwardly, as shown in Fig. 1, by depression of the frame F and movement of the bulldozer. Thus the roots of the stump can be cut. It is obvious that upward movement of the frame F enables the operator to raise the tool T to aid in breaking and removing the roots.

When the tool T is not required, it is released by withdrawal of the pin 21, the frame F is lowered, and the foot 13 of the tool T resting on the ground, the housing H will move downwardly over the tool T so that the tool T will assume its inoperative position, shown in solid lines in Fig. 4, and is locked in such position by the pin 21 inserted into hole 11-b of the wall 11 of the tool T by action of the spring 21.

When the tool T-1 is used, it can be inserted through the open upper end of the housing H and its foot 113 mounted by bolts 113-a after such insertion. It is obvious that the foot 113 is adjustable by provision of a plurality of bores 113-b for insertion of the bolts 113-a.

Having described my invention, what I claim is:

1. In a root cutter adapted to be mounted on an earth-working machine comprising a chassis, an arcuate frame having a cutting blade extending rectilinearly across the front of the chassis, and a pair of legs extending rearwardly from the ends of the frame, respectively, and pivotally mounted on the chassis, the combination of a housing having a pair of arcuate plates mounted on the upper and lower faces of one end of said frame, respectively, and on the upper and lower faces of the end of the adjacent leg of said frame, respectively, said plates being so configured and related to said housing as to dispose said housing rearwardly of said blade, forwardly of the ends of said frame and its leg, and in alignment with the axis of said leg; a cutting tool vertically slidably mounted in said housing; and means adapted to fasten said tool in adjusted relations to said housing.

2. A root cutter, according to claim 1, in which each of said plates has on its forward side a single flange engaging the outer faces of both the frame and its leg; and a pair of bolts adjacent the end of the frame and the end of the leg, respectively, connect the rear sides of said plates.

3. A root cutter, according to claim 1, in which said housing has a strengthening wall connecting said plates about the end of said leg.

References Cited in the file of this patent

UNITED STATES PATENTS

| 2,081,192 | Allin et al. | May 25, 1937 |
| 2,210,223 | Taylor | Aug. 6, 1940 |
| 2,297,677 | Forte | Oct. 6, 1942 |
| 2,364,657 | Proctor et al. | Dec. 12, 1944 |
| 2,475,710 | McCauley | July 12, 1949 |
| 2,486,372 | Rockwell | Oct. 25, 1949 |
| 2,497,351 | Fletcher | Feb. 14, 1950 |
| 2,528,170 | Peacock | Oct. 31, 1950 |
| 2,626,468 | Dobrinich | Jan. 27, 1953 |
| 2,695,468 | MacLeod et al. | Nov. 30, 1954 |
| 2,732,196 | Wood | Jan. 24, 1956 |
| 2,740,214 | Collins | Apr. 3, 1956 |